United States Patent [19]

Parker et al.

[11] 3,814,939

[45] June 4, 1974

[54] CHROMATO-FLUOROGRAPHIC DRUG DETECTOR

[75] Inventors: John A. Parker, Los Altos; John Dimeff, San Jose; Alvin H. Heimbuch, El Cerrito, all of Calif.

[73] Assignee: The United States of America as represented by the Administrator of the National Aeronautics and Space Administration, Washington, D.C.

[22] Filed: Apr. 25, 1973

[21] Appl. No.: 354,611

[52] U.S. Cl.................. 250/373, 250/343, 250/304
[51] Int. Cl. .............................................. G01t 1/00
[58] Field of Search................... 250/304, 373, 343; 73/23.1, 61.1 C

[56] References Cited
UNITED STATES PATENTS

| | | | |
|---|---|---|---|
| 2,974,227 | 3/1961 | Fisher et al. ........................ | 250/373 |
| 3,152,251 | 10/1964 | Schroeter............................ | 250/304 |
| 3,449,571 | 6/1969 | Hoerman ............................ | 250/304 |

*Primary Examiner*—Archie R. Borchelt
*Assistant Examiner*—Harold A. Dixon
*Attorney, Agent, or Firm*—Armand G. Morin, Sr.; Darrell G. Brekks; John R. Manning

[57] ABSTRACT

A drug detecting apparatus including a chromatographic system for separating a particular substance from a sample solution passed therethrough, a source of radiation for irradiating the separated substance as it moves through the chromatographic system and for causing it to fluoresce and emit fluorescent radiation, an optical system for spectrally separating the fluorescent radiation according to wavelength and for focusing particular portions of the separated spectrum through an exit aperture, a photodetector responsive to radiation passing through the exit aperture and operative to develop an electrical signal commensurate with the intensity of such radiation, and a recorder responsive to the electrical signal and operative to provide an indication of certain characteristics of the substance.

The invention described herein was made by employees of the United States Government and may be manufactured and used by or for the Government for governmental purposes without the payment of any royalties thereon or therefor.

10 Claims, 2 Drawing Figures

CHROMATO-FLUOROGRAPHIC DRUG DETECTOR

BACKGROUND OF THE INVENTION

1. Field of the Invention

The present invention relates generally to drug detection apparatus and more particularly to a novel self-scanning chromato-fluorographic drug detector which combines the chemical and optical properties of chromatography and spectrofluorometry with an optical readout system to provide a low cost, easy to operate, portable analytical drug detection instrument.

2. Description of the Prior Art

Although detection and quantization of the chemical constituents of various fluids has historically been done in a laboratory, there are today many cases in which it is desirable that means be available for providing an on-the-spot test. In the narcotics enforcement field for example, it is desirable for an arresting officer to have at his immediate disposal a suitable detection means for determining whether or not a suspect has ingested drugs.

Current methods used for the detection and determination of morphine in biological fluids involve the use of wet chemistry, thin layer chromatography, gas liquid chromatography, infrared techniques, electron spin resonance, and fluorescence spectrometry. Several commercially available instruments utilize one of the above methods to determine morphine in urine. However, such instruments usually are quite expensive and in most cases, require the use of laboratory facilities.

SUMMARY OF THE PRESENT INVENTION

It is therefore a principle object of the present invention to provide an analytical instrument of the type described for detecting certain chemicals in biological fluids while at the same time having the advantages of being portable, or providing direct readout and of being free from error due to potentially interferring compounds.

Briefly, the present invention utilizes a chromatographic column to separate the desired compound from a biological sample and a spectro-fluorometer for developing a time spectral trace of the desired compound as it passes through the column. The apparatus includes an ultraviolet lamp and optical filter for irradiating the separated compound and causing it to fluoresce as it moves through the column, a fixed grating for spectrally separating the fluorescent radiation, a lens system for collecting and focusing the rays of the spectrum, a photo-diode detector for detecting the luminous intensity of the rays of the spectrum, and a simple strip chart recorder for recording the spectral data.

Among the advantages of the present invention is that it provides an analytical instrument which is substantially less expensive than prior art devices, one which is readily portable so as to permit on-the-spot analysis of biological fluids, and one which permits the measurement of at least two characteristic parameters of the subject material.

These and other objects of the present invention will no doubt become apparent to those skilled in the art after having read the following detailed description of a preferred embodiment which is illustrated in the several figures of the drawings.

IN THE DRAWINGS

FIG. 1 is a schematic diagram illustrating the principle operative components of a chromato-fluorographic drug detector in accordance with the present invention; and FIG. 2 is a diagram illustrating a time-spectral trace produced by the apparatus shown in FIG. 1 as a fluorescent band of separated compound moves through the scanning region of the chromatographic column.

DETAILED DESCRIPTION OF THE PREFERRED EMBODIMENT

Figure 1:
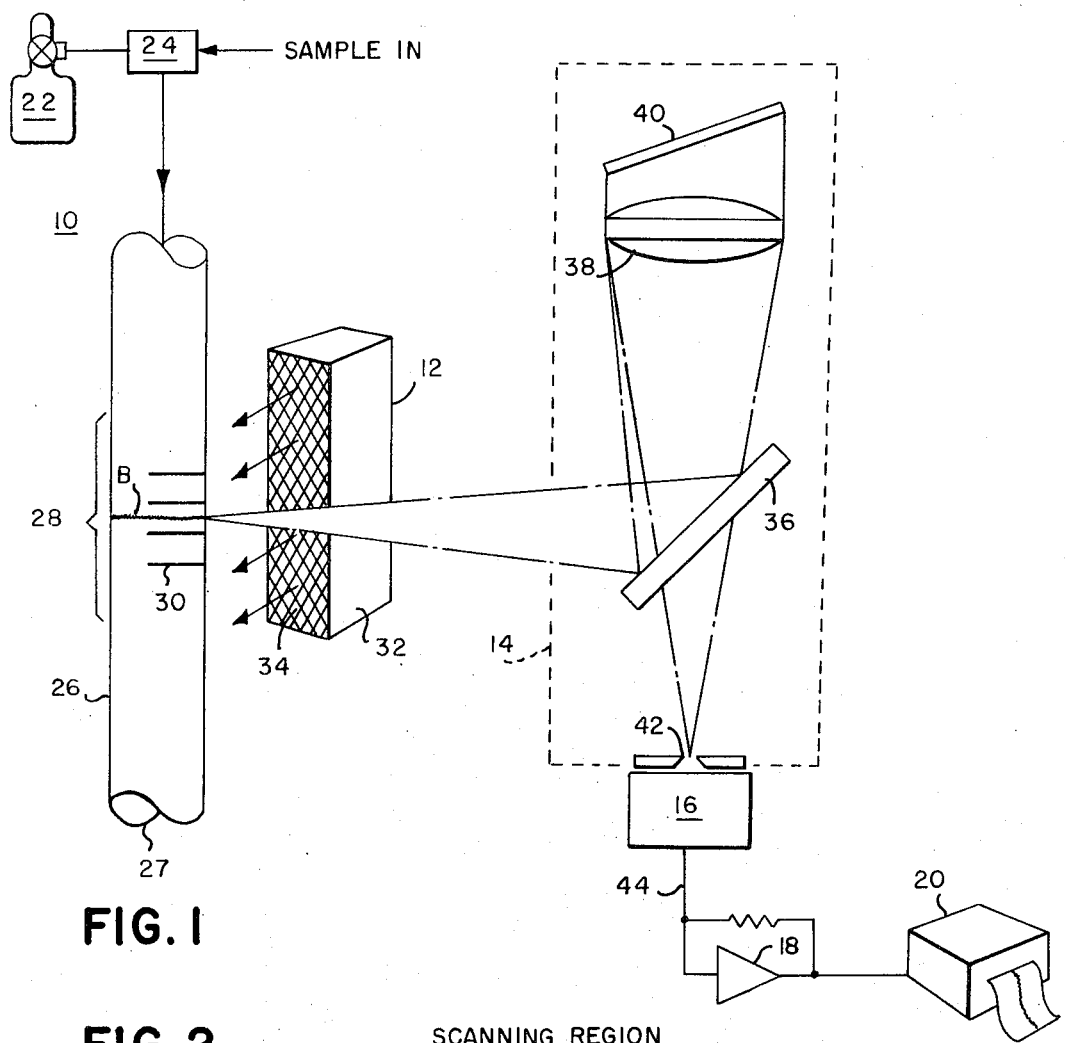
Figure 2:
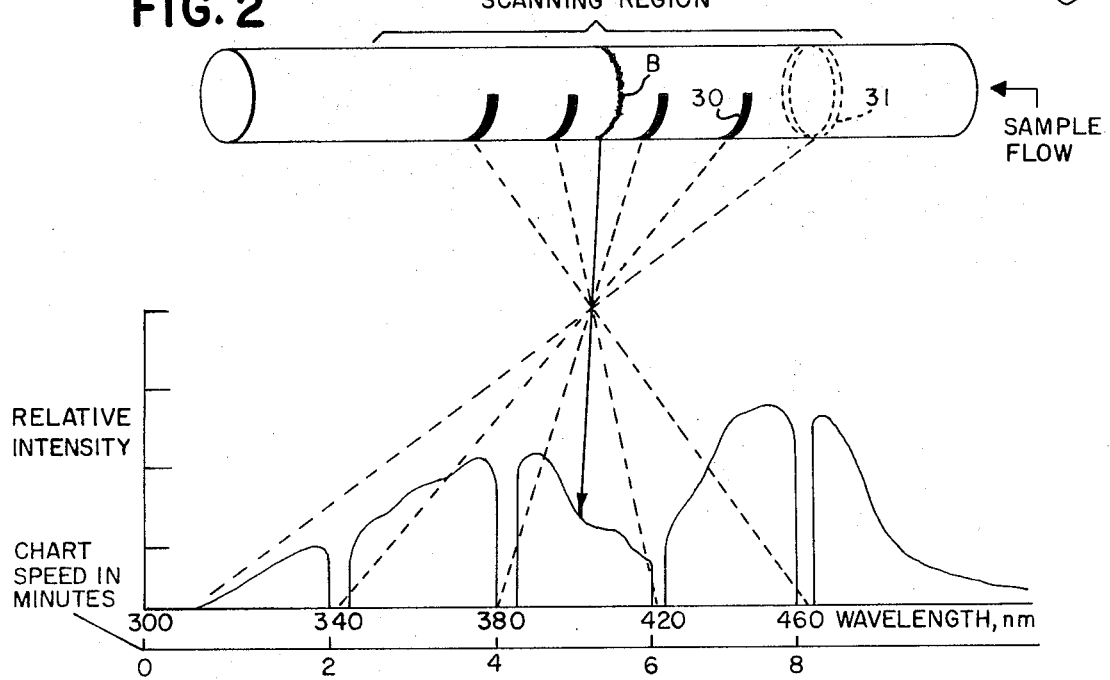

Referring now to FIG. 1 of the drawing, a schematic diagram of a drug detecting apparatus in accordance with the present invention is shown which includes a chromatographic system 10, a source of ultraviolet radiation 12, a spectrally selective optical system 14, a photo-detector 16, an amplifier 18, and a recorder 20. Chromatographic system 10 in the preferred embodiment includes a suitable developing solvent(s) 22, an injection block 24 for permitting a sample to be introduced into the chromatographic system which consists of column 26 having a cylindrical casing 27 which is packed with granular adsorbing material as is well known in the art and having at least a section 28 which is transparent to ultraviolet radiation and fluorescent radiation and which may be referred to as a scanning region or detection region.

The column 26 is of a length suitable to permit a particular type of sample to be separated into a narrow band B by the time the compound in question has traversed the column into the scanning region 28. The casing 27 has a number of masking strips 30 disposed in partially circumscribing, spaced-apart relationship on its surface as indicated. The strips 30 are equally spaced along the length of casing 27 and are preferably of a width at least as great as the maximum expected width of the band of separated sample compound B as it moves through the scanning region 28 of column 26.

The monochromatic source of ultraviolet radiation 12 may include any suitable type of ultraviolet lamp 32 and filter 34 along with means (not shown) for focusing the ultraviolet radiation onto at least the scanning region so as to cause any fluorescent material passing therethrough to fluoresce.

Optical system 14 includes a reflector such as the silvered mirror 36 which is positioned relative to the scanning region 28 so as to reflect fluorescent radiation upwardly as illustrated. The reflected radiation is collected by a collimating lens system 38 focused onto a fixed diffraction grating 40 which causes the light beam to be separated into its component colors and reflected back into lens 38. Lens 38 then collects and focuses a particular portion of the spectrum back through a suitable aperture, such as the slit 42, onto detector 16.

Detector 16 may include a photo-sensitive device, such as a photo-diode or the like, which develops an electrical output signal at 44 having a magnitude proportional to the intensity of the radiant energy impinging upon its light sensitive surface. Amplifier 18 is provided to amplify the output signal developed by detector 16 to a level suitable for driving recorder 20. Recorder 20 in the preferred embodiment includes a strip chart recording device but may alternatively include a meter, indicator, alarm or other device capable of providing a desired indication or response to the detected substance. It will also be appreciated that the optical system 14 may alternatively include a suitable prism type of dispersion apparatus or any other device capable of separating the fluorescent radiation developed by the fluorescing substance into its spectral components.

In operation, a liquid solution(s) is caused to flow from source 22 (note that 22 may represent one or several bottles containing developing solvents, buffered reagents, and fluorogenic reagents which react rather spectifically with, perhaps, a non-fluorescent compound to yield a derivative which becomes fluorescent before passing the scanning region 28) through mixer block 24 and chromatographic column 26. A sample quantity of test fluid containing the compound to be detected is injected into the stream through block 24. As the sample moves through column 26, the particular substance of interest will separate and move through the column in a disc-like band.

Upon moving into the scanning region 28, radiation from lamp 32 causes the band of separated substance to fluoresce thus forming a source of radiation which moves at a predictable rate (rate known by use of internal standards or known reproducibility under a specific and controlled chemical and physical environment) through the region 28. When the substance first enters the scanning region, mirror 36 reflects the fluorescent radiation onto diffraction grating 40 at an angle which causes a particular portion of the dispersion spectrum to be reflected back through collimating lens 38 and past the silvered mirror 36. Lens 38 causes certain wavelengths of the spectrally separated light rays to be focused through slit 42 and onto detector 16. Upon sensing the intensity of the radiation then passing through slit 42, detector 16 develops an electrical signal which is amplified by amplifier 18 and input to recorder 20 where its amplitude is recorded.

As the substance moves through the detection region, it will be noted that the angle of incidence of radiation upon mirror 36 changes, and likewise the angle of incidence of the radiation upon the fixed grating 40 changes. Accordingly, the effect of passage of band B through region 28 will be equivalent to a scanning of the spectrum of radiation emitted from the fluorescent band.

Since the several masks 30 are arranged at fixed positions along the column and the column is fixed in position relative to the optical system, each mask position corresponds to a particular wavelength, and the interruptions of the time spectral trace produced as the fluorescent band is obscurred by each mask, thereby provides a spectral calibration point which relates the chart position directly to spectral wavelength. From the known distance between the masks 30 and the chart speed of the recorder, the rate of movement of the band can be calculated accurately. Thus, the present apparatus provides a means for measuring the fluorescent spectrum characteristic of the fluorescing substance, the rate of movement of the band down the column to further confirm the compound type, and the spectral amplitude which provides a quantitative measure of the particular compound present in the urine specimen. Furthermore, these measurements are made simultaneously.

The present application has particular utility for measuring drugs such as morphine appearing in urine specimens since chemical treatment of the specimen can convert the weakly fluorescent morphine into a highly fluorescent fluorophore. After treatment, the sample can be very simply introduced into the chromatographic column 26 via injection block 24. The most sensitive morphine fluorophore compounds capable of identification by spectral photometric techniques are those that can be formed in aqueous solutions and preferably those in which the chemical reactions can be carried out in urine with a minimum of manipulations. It has, for example, been demonstrated that pseudomorphine and dansylmorphine are highly fluorescent compounds which can be formed in aqueous solutions on solid supports. However, other non-aqueous solutions may also be used provided the transfer of morphine from the aqueous to the non-aqueous phase can be accomplished quickly and efficiently. Colorometric derivatives or complexes of morphine may also be used if they are also fluorescent. Other morphine derivatives which can be formulated for measurement are:

1. The dimer of morphine, pseudomorphine,
2. The reaction product of 1-napthalene sulfonye chloride-5-dimethylamino (dansylchloride) and morphine,
3. The reaction product of lissamine Rodamine B (RB200), its sulfonylchloride, and morphine,
4. The diazonium salt of aminorosamine or other suitable amino fluorochrome with morphine,
5. The morphine fluorophore as prepared by Mule and Hushin, *Analytical Chemistry*, 43, No. 6, pp. 708–711 (1971),
6. The reaction product of morphine with the Marquis reagent,
7. The reaction product of 3-phenyl-7-isocyanatocoumarin with morphine.

The present invention provides an analytical instrument which will cost about 5–10 times less than any machine presently available. The instrument can be made readily portable to provide for on-the-spot analysis and is one which is capable of providing at least two characteristic parameters, one of which is the measure of a molecular property of the morphine fluorophore, i.e., its fluorescent spectrum.

The instrument is a self scanning device in that it has an optical readout system with no moving parts and uses the moving fluorescent band as a moving light source to yield a scan of the emission spectrum of the morphine fluorophore which may be recorded on a simple strip chart recorder. Such an instrument can be used for any fluorescent compound or its fluorescent derivative for which an appropriate chromatographic system can be designed. Other compounds such as certain vitamins and the amphetimine drugs, and many other aromatic drugs and food additives can also be detected and measured with an appropriately modified instrument.

The present invention is believed to be the first device of its type which is capable of simultaneously yielding at least two characterizing properties of morphine or one of its derivatives, i.e., the migration rate through a chromatographic system under a controlled and specific chemical environment, and the fluorescence spectrum of the morphine fluorophore, which is a molecular property and can be used for confirmatory evidence in legal matters. The instrument is believed to have extensive application in both the forensic and medical fields for detection of heroin and other dangerous drugs.

Although but a single preferred embodiment of the present invention has been disclosed herein, it will be apparent to those skilled in the art that many alterations and modifications thereof can be made to implement the invention for use in a particular application. It is therefore to be understood that the foregoing description is for purposes of illustration only, and the appended claims are to be interpreted as covering all such alterations and modifications as fall within the true spirit and scope of the invention.

What is claimed is:

1. Drug detecting apparatus, comprising:
   a chromatographic system having a column for separating a particular substance from a sample solution passed therethrough;
   a source of radiation for irradiating the separated substance as it moves through said chromatographic column and for causing it to fluoresce and emit fluorescent radiation;
   optical means for spectrally separating said fluorescent radiation according to wavelength and for focusing particular portions of the separated spectrum through an exit aperture;
   detecting means responsive to radiation passing through said exit aperture and operative to develop an electrical signal commensurate with the intensity of such radiation; and
   means responsive to said electrical signal and operative to provide an indication of certain characteristics of said substance.

2. Drug detecting apparatus as recited in claim 1 wherein said optical means includes a reflector, a lens system, diffraction grating and means forming said exit aperture, said reflector being operative to reflect said fluorescent radiation through said lens system and onto said grating, said grating being operative to spectrally separate said radiation and direct the separated rays back into said lens system wherein rays of particular wavelengths are collected by said lens system and focused onto said aperture forming means, whereby movement of the fluorescing substance through said column causes the spectrum to sweep across said exit aperture so that the portions of the spectrum passing through said aperture change in proportion to the position of the substance in said column.

3. Drug detecting apparatus as recited in claim 1 wherein said chromatographic system includes an adsorption column having a section transparent to said fluorescent radiation, said section being provided with opaque masks disposed in spaced apart relationship along the path to be followed by said substance as it passes through said column and for blocking radiation from said optical means as said substance passes behind said masks.

4. Drug detecting apparatus as recited in claim 3 wherein said section is generally cylindrical in configuration and said opaque masks include opaque strips at least partially circumscribing said section, said strips having a width at least as large as the maximum longitudinal length of the separated substance when it passes through said section.

5. Drug detecting apparatus as recited in claim 4 wherein said optical means includes a reflector, a lens system, diffraction grating and means forming said exit aperture, said reflector being operative to reflect said fluorescent radiation through said lens system and onto said grating, said grating being operative to spectrally separate said radiation and direct the separated rays back into said lens system wherein rays of particular wavelengths are collected by said lens system and focused onto said aperture forming means, whereby movement of the fluoresing substance through said column causes the spectrum to sweep across said exit aperture so that the portions of the spectrum passing through said aperture change in proportion to the position of the substance in said column.

6. Drug detecting apparatus as recited in claim 1 wherein said optical means includes a diffraction grating which is operative to spectrally separate said radiation so that a single portion of the radiation spectrum may be projected through said exit aperture at a particular point in time.

7. Drug detection apparatus as recited in claim 6 wherein said detecting means includes a photodetector positioned externally of said exit aperture for receiving the portion of said spectrum passing through said aperture, and wherein said means responsive to said electrical signal includes a strip chart recorder for providing a time vs. signal-amplitude record.

8. Drug detecting apparatus, comprising:
   a chromatographic system for separating a particular substance from a sample solution passed therethrough and including an adsorption column having a section transparent to fluorescent radiation;
   a source of radiation for irradiating the separated substance as it moves through said transparent section and for causing said substance to fluoresce and emit fluorescent radiation;
   optical means for separating said fluorescent radiation according to wavelength and for focusing particular portions of the separated spectrum through an exit aperture;
   detecting means responsive to radiation passing through said exit aperture and operative to develop an electrical signal commensurate with the intensity of such radiation; and
   means responsive to said electrical signal and operative to provide an indication of certain characteristics of said substance.

9. Drug detecting apparatus as recited in claim 8 wherein said optical means includes a diffraction grating for receiving and spectrally separating said fluorescent radiation, means forming said exit aperture, and a lens system for focusing the spectrally separated rays onto said aperture forming means, whereby movement of the fluorescing substance through said section causes the spectrum to sweep across said exit aperture so that the portions of the spectrum focused upon said aperture change in proportion to the position of the substance in said column.

10. Drug detecting apparatus as recited in claim 9 wherein said section is generally cylindrical in configuration and is provided with opaque masks disposed in spaced apart relationship along the path followed by said substance as it passes through said column, said masks being operative to block radiation from said optical means as said substance passes behind said masks.

* * * * *